Aug. 18, 1970 A. J. BAGGOTT 3,525,078

APPARATUS FOR TRANSMITTING DATA OVER ELECTRIC POWER SUPPLY NETWORK

Filed Dec. 29, 1966 2 Sheets-Sheet 1

INVENTOR
ALBERT JEFFERIES BAGGOTT
BY
ATTORNEY

INVENTOR
ALBERT JEFFERIES BAGGOTT
BY
ATTORNEY

United States Patent Office 3,525,078
Patented Aug. 18, 1970

3,525,078

APPARATUS FOR TRANSMITTING DATA OVER ELECTRIC POWER SUPPLY NETWORK

Albert Jefferies Baggott, London, England, assignor to Londex Limited, a British company, and London Electricity Board, both of London, England Filed Dec. 29, 1966, Ser. No. 605,778
Claims priority, application Great Britain, Dec. 30, 1965, 55,197/65
Int. Cl. H04b 3/54
U.S. Cl. 340—172.5 2 Claims

ABSTRACT OF THE DISCLOSURE

Data handling apparatus is disclosed in which data is transmitted by means of the public electricity supply network. A transmitter is arranged to modify the shape of predetermined portions of the waveform of the voltage or current in the network, the positions of the portions so modified, the number of such portions and the length of time within which they occur being dependent on the data to be transmitted. A receiver detects the modifications of the shape of the waveform representing the data transmitted, and includes means for rejecting other modifications caused by, for example, noise.

The invention relates to data handling apparatus.

According to the invention, there is provided a method of transmitting data, including the step of modifying the level of an electrical parameter during at least one time interval having a predetermined time position dependent on the data to be transmitted.

According to the invention, there is also provided data handling apparatus, including transmitting means operative in response to data to be transmitted to modify the level of an electrical parameter during at least one time interval having a predetermined time position dependent on the data to be transmitted.

According to the invention, there is further provided apparatus for transmitting data, including transmitting means operative in response to the data to be transmitted to modify the shape of a predetermined number, greater than one, of portions of the wave form of an alternating voltage or current, the predetermined number of portions all occurring within a predetermined length of time.

According to the invention, there is further provided apparatus for receiving data transmitted by modification of the shape of predetermined portions of the waveform of an alternating voltage or current, including receiving means responsive to the said alternating voltage or current, and operative to detect modifications of the shape of said portions of the waveform to produce an output signal representing the said data.

Apparatus embodying the invention for transmitting and receiving data will now be described by way of example and with reference to the accompanying drawings in which.

Figure 1:
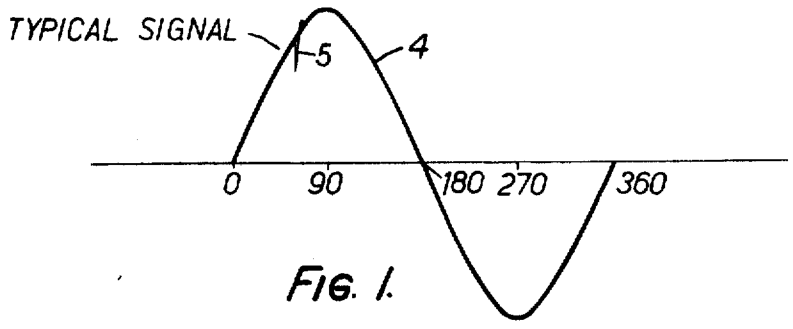
FIGS. 1 and 2 show waveforms of current or voltage in an electricity supply network.
Figure 2:
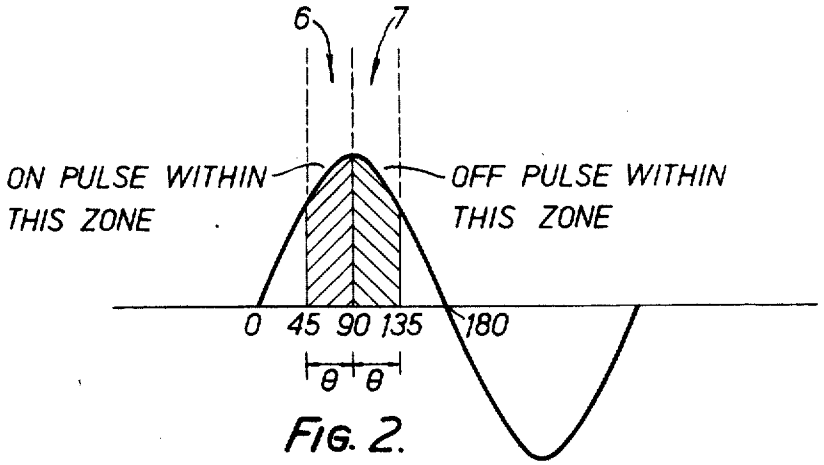

In the system to be described, data is transmitted by means of momentary modifications of the shape of the sine wave of the voltage or current in a single or three phase electricity supply network. FIG. 1 shows a cycle of the voltage or current waveform 4, the shape of the sine wave being momentarily modified, as shown by the pulse 5, in response to data to be transmitted. An item of data is in fact represented by several such pulses 5, and, at the receiver, the presence of these pulses 5 is detected and an appropriate output signal produced in a manner to be described to indicate receipt of the data. In order to assist in discriminating between a pulse 5 and some other transient change in the shape of the waveform, the transmitter is arranged so that pulses 5 can only be produced within portions or bands each lying in a predetermined position within a half cycle of the voltage or current. FIG. 2 shows a cycle of the sine wave of the voltage or current, the positive half of which is divided into two bands 6 and 7, each of length $\theta$, $\theta$ in this case being 45°. One band extends from 45° to 90° of the half cycle, and the other band 7 extends between 90° and 135° of the half cycle. If data is to be transmitted in binary form, then each pulse 5 lying within a band 6 may represent a "1" or an "ON" signal, while each pulse 5 lying within a band 7 may represent a "0" or an "OFF" signal .

As illustrated, the pulses 5 are produced by momentary abstration of energy from the alternating voltage or current, and a preferred method of effecting such abstraction is momentarily to connect a discharged capacitor across the electricity supply network by means, for example, of silicon controlled rectifiers. However, data may be transmitted instead by momentary augmentation of the energy of the alternating voltage or current, in which case the shape of the pulses 5 would be different from that shown; augmentation could be effected by, for example, momentarily connecting a previously charged capacitor across the electricity supply network.

Figures 3, 4:
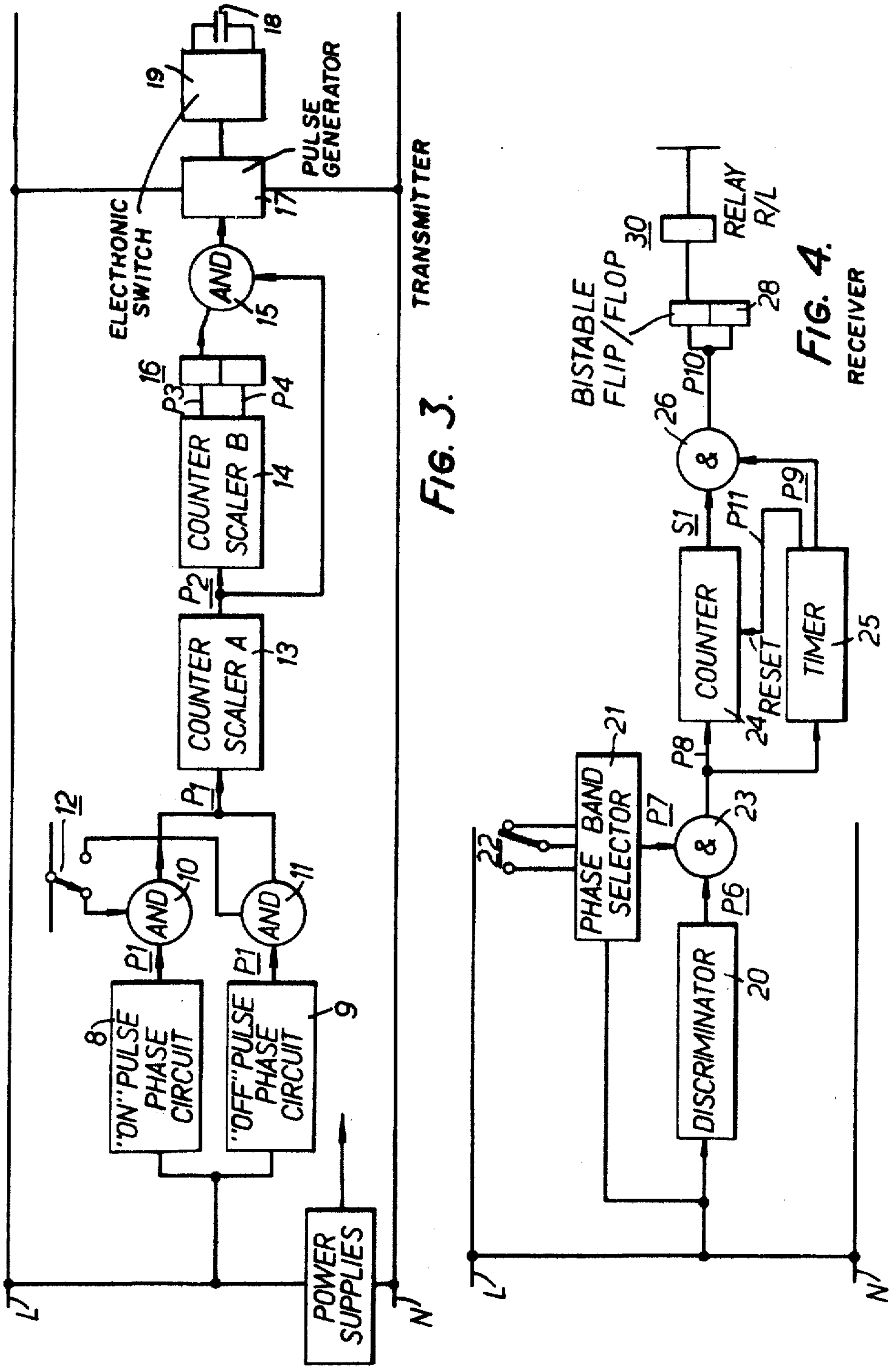
FIG. 3 shows, in block diagram form, a transmitter embodying the invention.
FIG. 4 shows, in block diagram form, a receiver embodying the invention.

The transmitter will now be described with reference to FIG. 3. It includes two synchronising circuits 8 and 9 which are connected across the electricity supply lines L and N. Each circuit 8 and 9 includes a phase-sensitive means so arranged that the circuit 8 produces pulses P1 synchronously with, and having the same length as, each band 6 (FIG. 2), while the circuit 9 produces pulses P1 synchronously with, and having the same length as, each band 7 (FIG. 2). The pulses P1 from the circuits 8 and 9 are fed to AND gates 10 and 11 respectively, which are controlled by means of a manually operable switch 12. The switch is set in one or other of two positions according to whether a "1" signal or a "0" signal is to be transmitted. In the position illustrated, the switch 12 is set to activate the gate 10 so that pulses P1 from circuit 8 pass through the gate 10 to a counter 13. The pulses P1 from circuit 9 are prevented from passing to the counter. This setting of the switch indicates that the data to be transmitted represents "1" signals. If the switch 12 is set in its opposite position, then gate 11 is activated instead of the gate 10 and the pulses from the circuit 9 pass to the counter 13. The pulses P1 from circuit 8 are, in this case, prevented from passing to the counter.

The counter 13 produces a single pulse P2 on receipt of each sequence of five pulses P1. The output of the counter 13 is connected to a further counter 14 and also to a further AND gate 15. The counter 14 has two outputs which are connected to a bistable unit 16. The counter 14 counts the number of pulses P2 received and produces a pulse P3 on one of its outputs at the start of a count (the start of the count need not necessarily coincide with receipt of the first pulse P2). The pulse P3 sets the bistable unit 16 into a condition in which it activates the gate 15 thus enabling the pulses P2 from the counter 13 to pass through the gate to a pulse generator 17. Each pulse P2 passing to the pulse generator 17 causes the latter to connect a discharged capacitor 18 momentarily across the power supply lines, by means of a suitable electronic switch 19 (shown diagrammatically only). This momentary connection of the discharged capacitor 18 produces a pulse 5 (FIG. 1), this pulse 5 occurring during a band 6 (FIG. 2) because, as explained, the switch 12 is set in the position in which it is activating the gate 10. After a predetermined number of pulses P2 has been received by the counter 14, the counter produces a pulse P4 which sets the bistable unit 16 into the opposite condition, in which it switches off the gate 15, thus preventing any further pulses P2 from passing to the pulse generator 17.

It will therefore be seen that the counter 13 controls the interval between successive pulses 5 (FIG. 1) to be transmitted, while the counter 14 controls the total number of pulses 5 transmitted.

The receiver will now be described with reference to FIG. 4. The receiver includes a discriminator 20 which is connected across the lines L and N of the electricity supply network and which is arranged to be responsive to all transient changes in the shape of the sine wave form of the voltage of the supply; it produces a pulse P6 in response to each such transient change. It will be appreciated that inevitably some of these pulses P6 represent transient changes due to noise and the like, and not due to deliberate modification of the shape of the sine wave by the transmitter (FIG. 3).

The receiver also includes a phase band selector 21 which is connected to the lines L and N of the electricity supply network and which produces pulses P7, each of which is coincident with, and has the same length as, either a band 6 or a band 7 (FIG. 2). The selector 21 is controlled by a switch 22, and the setting of this switch determines whether the pulses P7 are coincident with the bands 6 or with the bands 7.

The pulses P6 and the pulses P7 are both fed to an AND gate 23 which produces a pulse P8 in response to each pulse P6 which occurs during the duration of a pulse P7. The pulses P8 are fed to a counter 24 and to a timer 25. Each pulse P8 initiates the timer 25 which produces a pulse P9 after a predetermined time delay; the pulses P9 are supplied to one input of an AND gate 26. The counter 24 counts the pulses P8 received and produces an output signal S1 at the instant the correct count is reached; the signal S1 disappears immediately when one pulse P8 in excess of the correct number is received but is otherwise maintained until the counter is reset. The signal S1 is supplied to, and activates, the AND gate 26.

In operation, therefore, the AND gate 26 produces an output pulse (P10) if a pulse P9 from the timer 25 occurs while the gate is being activated by signal S1. Each pulse P10 is applied to a bistable unit 28 and switches it into a condition in which it operates a relay 30 to indicate receipt of an item of data. It will be seen therefore that relay 30 is only operated if a predetermined number (neither more nor less) of pulses P8 are received within a predetermined length of time, the predetermined number of pulses being set by the counter 24 and the predetermined length of time being set by the timer 25. In addition, each pulse P8 is only produced provided that a pulse P6 occurs during a pulse P7 from the phase band selector 21. Therefore, the phase band selector 21, the counter 24 and the timer 25 all co-operate to ensure that the input pulses P6 only cause operation of relay 30 if their occurrence satisfies predetermined conditions. In this way incorrect operation of the relay 30 in response to noise signals is avoided.

The relay 30 can be used to initiate the carrying out of some operation prescribed by the received data, and the data can be fed into a computer for processing. It will be appreciated that, because of the setting of the switch 22, the data received in the example described represents a "1" signal. When the switch 22 is in its opposite setting, operation of the relay indicates receipt of a "0" signal. The relay 30 itself may be arranged to operate the switch 22 into its opposite position so that receipt of data of one type ("1" or "0" signals) causes the switch to be set so as to allow receipt of data of the opposite type.

The timer 25 is arranged to produce a pulse P11 immediately after each pulse P9. The pulses P11 are fed to the counter 24 and reset it so that it restarts its counting operation in response to the next received pulse P8.

It will be appreciated that the width of the bands 6 and 7 (FIG. 2) need not be 45° but may be any other suitable width: for example, the bands may be considerably more narrow than 45°, or they may be wider than a half cycle.

The relay 30 (FIG. 4) in the receiver may be replaced by any other suitable output device. It may, for example, be replaced by a counter or other device responsive to receipt of a predetermined number or sequence of pulses.

In a modification, the pulses 5 (FIG. 1) are produced during predetermined but irregularly spaced ones of the bands 6 or 7 (FIG. 2). The timer 25 in the receiver (FIG. 4) is replaced by a coincidence detector which is synchronised with the waveform of the supply on the lines L and N and programmed so as to produce a pulse P9 (FIG. 4) to the AND gate 26 only if it detects occurrence of pulses P8 during respective ones of the predetermined irregularly spaced bands 6 or 7. In this way, the coincidence detector performs the function, similar to that of the timer 25, of helping to prevent response of the receiver to noise and the like.

It will be appreciated that the data transmitted can be varied by varying the number of consecutive modifications of the shape of the waveform which are produced by the transmitter. The predetermined count to which the counter 24 responds would be adjusted accordingly and appropriate alteration could also be made to the setting of the timer 25 as necessary.

Although the embodiment described is particularly for for use with an alternating supply, the invention may be used with a direct current supply: in such a case, data is transmitted by modification of the level of the direct current or voltage during time intervals having predetermined time positions with respect to a datum, and means would be provided for synchronising the operation of the receiver with the occurrence of the time intervals.

What I claim is:

1. Data handling apparatus, comprising an electrical source producing an alternating waveform, and transmitting means connected to the source and responsive to data to be transmitted and operative to modify the shape of a predetermined number, greater than one, of portions of the said waveform, the predetermined number of portions all occurring within a predetermined length of time and each said portion having a time position within a respective half-cycle of the waveform which time position depends on the data to be transmitted, the said transmitting means including

- control means connected to the said source and operative to generate first pulses each of which defines the length and position of a respective said portion of a half-cycle of the waveform,
- modifying means connected to the said source and operative to modify the shape of the said waveform when activated,
- a first counter connected to receive the said first pulses and operative to produce a second pulse after receipt of a predetermined plurality of said first pulses,
- gating means connected to receive the said second pulses,
- a second counter connected to receive said second pulses and connected to the said gating means and operative to open the said gating means to allow a predetermined number of said second pulses to pass therethrough, and
- means connecting said modifying means to said gating means whereby the said modifyng means is activated by each said second pulse passing through the gating means.

2. Data handling apparatus, comprising an electrical source producing an alternating waveform, transmitting means connected to the source and responsive to data to be transmitted and operative to modify the shape of a predetermined number, greater than one, of portions of the said waveform, the predetermined number of portions all occurring within a predetermined length of time and the time position, relative to the waveform, of each said portion being dependent on the said data, means connected to the said source to receive the said alternating waveform and operative to produce control pulses occurring synchronously with the said portions, means connected to receive the said control pulses and to receive the said waveform after modification thereof by the said transmitting means and operative to produce an intermediate pulse in response to any said modification which occurs during each said control pulse, a counter responsive to the said intermediate pulses and operative to produce a gating signal commencing when a predetermined number of said intermediate pulses has been received and ending when a greater predetermined number of said intermediate pulses has been received, timing means responsive to the intermediate pulses for producing a further pulse after a predetermined time delay has occurred, and gating means connected to receive said gating signal and said further pulses and operative to produce an output signal representing the said data in response to each said further pulse which occurs during existence of a said gating signal.

References Cited

UNITED STATES PATENTS

| | | | |
|---|---|---|---|
| 3,121,215 | 2/1964 | Kelar et al. | 340—170 |
| 2,557,581 | 6/1951 | Triman | 340—348 |
| 2,861,257 | 11/1958 | Weintraub | 340—288 |
| 2,887,674 | 5/1959 | Greene | 340—174.1 |
| 2,936,444 | 5/1960 | Hieken | 340—174.1 |
| 2,962,669 | 11/1960 | Mahler | 332—9 |
| 3,088,099 | 4/1963 | DuVall | 340—345 |
| 3,098,215 | 7/1963 | Waite | 340—172.5 |
| 3,128,342 | 4/1964 | Baker | 340—170 |
| 3,251,051 | 5/1966 | Harries et al. | 340—345 |

PAUL J. HENON, Primary Examiner

P. R. WOODS, Assistant Examiner